United States Patent
Schoueri et al.

(10) Patent No.: US 10,949,440 B2
(45) Date of Patent: Mar. 16, 2021

(54) METADATA-DRIVEN DATA MANAGEMENT PLATFORM

(71) Applicant: Next Pathway Inc., Toronto (CA)

(72) Inventors: Badih Schoueri, Mississauga (CA);
Gregory Gorshtein, Thornhill (CA);
Qiang (Herman) Yu, Richmond Hill (CA)

(73) Assignee: NEXT PATHWAY INC., Toronto (CA)

(*) Notice: Subject to any disclaimer, the term of this patent is extended or adjusted under 35 U.S.C. 154(b) by 351 days.

(21) Appl. No.: 15/909,833

(22) Filed: Mar. 1, 2018

(65) Prior Publication Data

US 2018/0253477 A1  Sep. 6, 2018

Related U.S. Application Data

(60) Provisional application No. 62/466,731, filed on Mar. 3, 2017.

(51) Int. Cl.
| G06F 17/30 | (2006.01) |
| G06F 16/25 | (2019.01) |
| G06F 3/06 | (2006.01) |
| G06F 16/10 | (2019.01) |

(52) U.S. Cl.
CPC .......... *G06F 16/254* (2019.01); *G06F 3/0643* (2013.01); *G06F 16/10* (2019.01)

(58) Field of Classification Search
CPC ....... G06F 16/254; G06F 16/10; G06F 3/0643
See application file for complete search history.

(56) References Cited

U.S. PATENT DOCUMENTS

| 7,043,687 | B2* | 5/2006 | Knauss | G06Q 40/02 715/236 |
| 8,949,175 | B2 | 2/2015 | Wu et al. | |
| 2004/0236858 | A1* | 11/2004 | Schwartz | G06Q 10/06 709/230 |
| 2012/0158667 | A1* | 6/2012 | Raju | G06F 16/84 707/687 |
| 2013/0275363 | A1* | 10/2013 | Wu | G06F 9/46 707/602 |
| 2014/0279834 | A1* | 9/2014 | Tsirogiannis | G06F 16/86 707/602 |
| 2014/0297569 | A1* | 10/2014 | Clark | G06Q 10/00 706/11 |
| 2017/0115924 | A1* | 4/2017 | Abali | G06F 9/543 |

(Continued)

*Primary Examiner* — Huawen A Peng
(74) *Attorney, Agent, or Firm* — Lewis Roca Rothgerber Christie LLP

(57) ABSTRACT

The present invention relates, in an embodiment, to a system for automatically ingesting data into a data lake. In an embodiment of the present invention, the system comprises computer readable memory having recorded thereon instructions for execution by a processor having an ingestion engine and a metadata model. In an embodiment of the present invention, the instructions are configured to determine, via the metadata model, a type of metadata the ingested data contains; to generate guidelines for processing and transforming the ingested data based on the determined metadata; to apply the guidelines at the ingestion engine for how the ingestion engine processes and transforms the ingested data based on the determined metadata; and to store the transformed ingested data to a storage repository.

14 Claims, 3 Drawing Sheets

(56) References Cited

U.S. PATENT DOCUMENTS

| | | | |
|---|---|---|---|
| 2017/0139956 A1* | 5/2017 | Qiao | H04L 67/02 |
| 2017/0199875 A1* | 7/2017 | Nevrekar | G06F 16/9032 |
| 2017/0235848 A1* | 8/2017 | Van Dusen | G06F 16/904 |
| | | | 705/12 |
| 2017/0286506 A1* | 10/2017 | Yin | G06F 16/254 |

* cited by examiner ial Patent Application Ser. No. 62/466,731,
METADATA-DRIVEN DATA MANAGEMENT PLATFORM

CROSS REFERENCE TO RELATED APPLICATION

This patent application claims priority to and the benefit of U.S. Provisional Patent Application Ser. No. 62/466,731, filed on Mar. 3, 2017, the entire content of which is hereby expressly incorporated by reference.

FIELD OF THE INVENTION

The present invention relates generally to large-scale data management.

BACKGROUND OF THE INVENTION

Big data is a term for data sets that are so large or complex that traditional data processing applications are inadequate to deal with them. Data sets grow rapidly—in part because they are increasingly gathered by cheap and numerous information-sensing devices and networks. The world's technological per-capita capacity to store information has increased phenomenally.

The current approaches to ingesting data into an Enterprise Data Lake (EDL) involve using extract, transform, load (ETL) tools and manual mapping using the tools of data from source system into the target system (the EDL in this case). The output of these tools is code that must be processed through the Software Development Lifecycle (SDLC), in order to be promoted from a development environment all the way through to a production environment. This cycle creates lengthy delays between the time a user of the data makes a request to add the data to the EDL, and the time the data becomes available to them.

Furthermore, nuances between the way different developers write these ETLs create inconsistencies in the output and the landed data in the EDL can never be fully standardized. Consumers then have difficulties trying to develop a self-serve model, since considerable time would be exhausted attempting to standardize each format and structure of every dataset they need to consume. Often, the consumer would have to contact the developer of the associated ETL.

U.S. Pat. No. 8,949,175 provides a generic approach for automatically ingesting data into an Hadoop File System (HDFS)-based data warehouse including a datahub, a generic pipelined data loading framework, and a meta-data model that, together, address data loading efficiency, data source heterogeneities, and data warehouse schema evolvement. The generic loading framework, datahub, uses a MapReduce framework to address loading efficiency. The meta-data model is comprised of configuration files and a catalog. The configuration file is setup per ingestion task. The catalog manages the data warehouse schema. When a scheduled data loading task is executed, the configuration files and the catalog collaboratively drive the datahub server to load the heterogeneous data to their destination schemas automatically.

There is an increased need for a self-serve approach for data providers to make their data available within a data lake. Data providers currently require the intervention of IT to either develop code to ingest their datasets, or to deploy any producer code/workflows that need to be tested following the SDLC process.

There is an increased need for data providers to have control over their datasets, particularly with respect to security. The data lake should respect the security classification of datasets as specified by their owners.

There is an increased need for a self-serve approach for data consumers for searching, discovering, validating, and consuming the data that is made available to them in the data lake. Furthermore, there is a need for a self-serve approach for data consumers to specify how they want to integrate sources, targets, algorithms (e.g., decisioning, machines learning, analytics), and visualization components together. There is a need to be able to test their integration dynamically, but also have the ability to save and promote their changes in a controlled matter into other environments (e.g., BAT, Production).

There exists a need for a self-serve approach to deploying and scheduling transformations and data management rules.

SUMMARY OF THE INVENTION

An object of the present invention is to overcome the deficiencies in the prior art associated with the management of large-scale data. Further objects of the present invention will be apparent to persons skilled in the art reading the following summary of the invention, brief description of the drawings and detailed description of the embodiments.

In accordance with an aspect of the present teachings, there is provided a system for automatically ingesting data into a data lake, the system comprising: computer readable memory having recorded thereon instructions for execution by a processor having an ingestion engine and a metadata model, said instructions configured: to determine, via the metadata model, a type of metadata the ingested data contains; to generate guidelines for processing and transforming the ingested data based on the determined metadata; to apply the guidelines at the ingestion engine for how the ingestion engine processes and transforms the ingested data based on the determined metadata; and to store the transformed ingested data to a storage repository.

In an embodiment of the present invention, the generated guidelines include specifying a source type and encoding for the metadata.

In an embodiment of the present invention, the generated guidelines include specifying each type of record within the ingested data and how to manage each type of record.

In an embodiment of the present invention, transforming the ingested data includes standardizing the ingested data.

In an embodiment of the present invention, the system further comprises applying security policies to the ingested data based on the determined metadata.

In an embodiment of the present invention, the determined metadata may be technical metadata or business metadata.

In an embodiment of the present invention, a source for the ingested data is selected from the group consisting of a COBOL file, common separated values format, and ORACLE files.

In accordance with another aspect of the present teachings, there is provided a computer-implemented method for automatically ingesting data into a data lake having steps of: determining a type of metadata the ingested data contains; generating guidelines for processing and transforming the ingested data based on the determined metadata; processing and transforming the ingested data based on the generated guidelines; and storing the transformed ingested data to a storage repository based on the determined metadata.

In an embodiment of the present invention, the generated guidelines include specifying a source type and encoding for the metadata.

In an embodiment of the present invention, the generated guidelines include specifying each type of record within the ingested data and how to manage each type of record.

In an embodiment of the present invention, transforming the ingested data includes standardizing the ingested data.

In an embodiment of the present invention, the method further comprising applying security policies to the ingested data based on the determined metadata.

In an embodiment of the present invention, the determined metadata may be technical metadata or business metadata.

In an embodiment of the present invention, a source for the ingested data is selected from the group consisting of a COBOL file, common separated values format, and ORACLE files.

BRIEF DESCRIPTION OF THE DRAWINGS

An embodiment of the present invention will now be described, by way of example only, with reference to the attached Figures, wherein.

DETAILED DESCRIPTION OF THE EMBODIMENT

Figure 1:
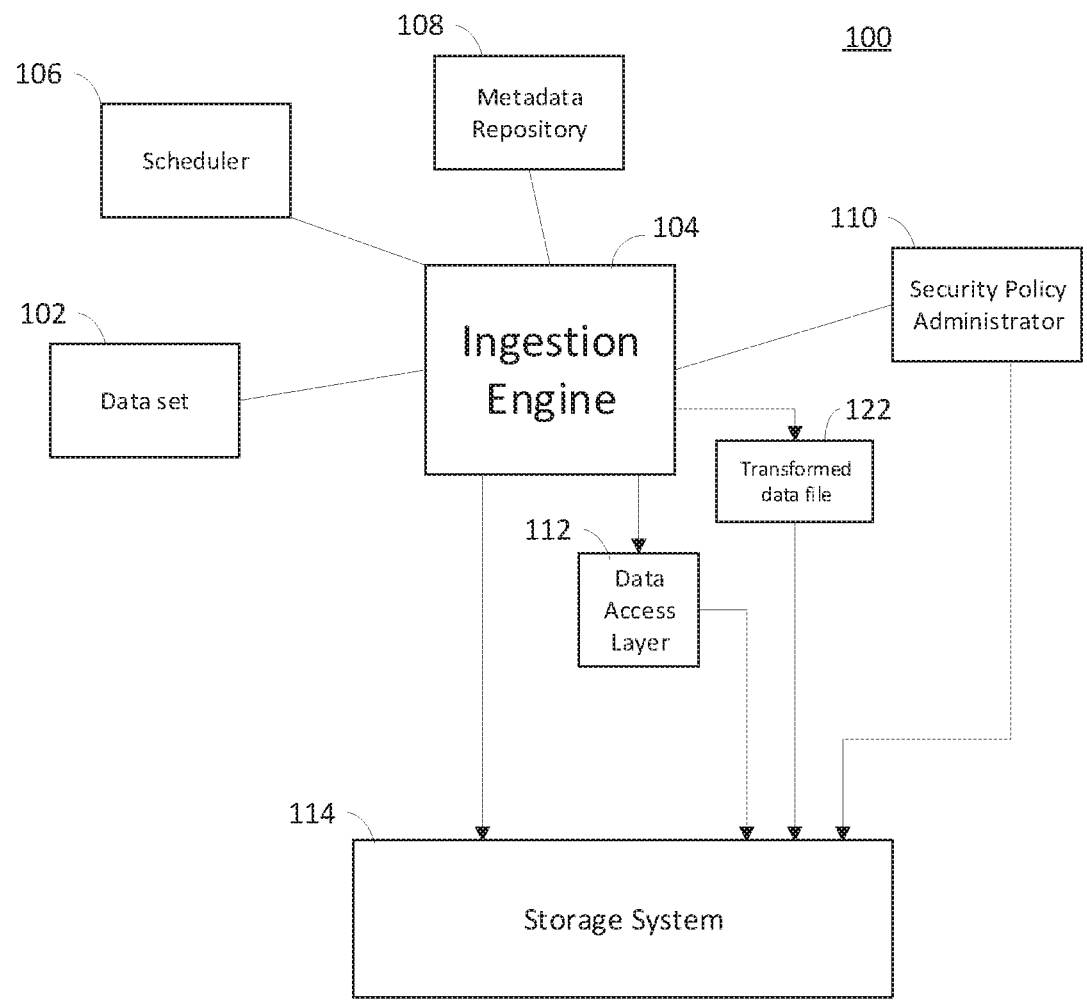
FIG. 1 shows a high-level architecture of a system for managing datasets in a data lake in accordance with an embodiment of the present invention.

Turning to FIG. 1, a high-level system is shown for managing datasets in a data lake and is generally referenced by the numeral 100. The system 100 includes, but is not limited to, an ingestion engine 104, a scheduler 106, a metadata repository 108, a security policy repository 110, a data access layer 112, and a storage system 114.

The ingestion engine 104 is metadata driven and is responsible for ingesting, standardizing, validating, curating, securing, cataloging, and exposing the dataset 102. To accomplish all these functions in an automated way, the ingestion engine 104 relies on the source metadata that is provided with the dataset 102. The source metadata follows the metadata model in FIG. 2A and FIG. 2B and is generally referenced by the number 200. The metadata model 200 captures all the information across three types of source metadata that the ingestion engine 104 utilizes to handle the dataset 102. There are generally three types of source metadata: technical metadata, operational metadata, and business metadata.

The ingestion engine 104 executes in a distributed manner in order to parallelize ingestion and can execute on various runtime platforms including Cloud Foundry™, Apache YARN™, Apache Mesos™, and Kubernetes™.

The source metadata contains the instructions that the ingestion engine 104 uses to process the associated dataset. This includes, but is not restricted to, instructions for securing the dataset, the type of the source (e.g., COBOL™, ORACLE™ database, Twitter™), as well as the type of the target (e.g., Avro™ on HDFS™, Druid™ Cassandra™) that allows the ingestion engine 104 to automatically determine how the data needs to be mapped and standardized from the source to the target, the business metadata that provides semantic context for the technical metadata, information about the source system and provider, service level agreement (SLA) around the dataset, and data lifecycle instructions.

Technical metadata describes the technical aspects of the corresponding dataset. This includes the schema of the dataset and specifies the structure and type of each item in the dataset. For example, the technical metadata for a delimited dataset would include the delimiter (e.g., a comma), the name of each field that are delimited, and the data type of each field (e.g., string, integer, decimal). The ingestion engine 104 uses the technical metadata to determine the encoding type (e.g., Extended Binary Coded Decimal Interchange Code (EBCDIC)) and automatically convert the encoding as well as the source data types to the target encoding and data types for the target format specified in the metadata.

Operational metadata comes in two forms—run time and on-boarding time. Run time operational metadata reflects the state of a dataset every time records are added, updated or deleted. On-boarding metadata typically describes lifecycle attributes of the dataset. This includes, but is not limited to, security information, life expectancy, and ownership. For example, for a certain dataset that needs to be ingested into the data lake daily, run time metadata would include the time when the data on a certain day for that dataset was ingested into the data lake, and would be captured automatically by the system 100, whereas on-boarding metadata, such as life expectancy or ownership of the dataset, would be provided.

Business metadata provides business context and semantics to the technical metadata, such that a consumer of the dataset can understand what the underlying data means, or how the data should flow (from a business process perspective). For example, the business metadata for an integer field could be "Age". This would allow a consumer of the dataset to understand that the values within the column defined by that field are referring to the age of the entity defined by each entry in that dataset.

The ingestion engine 104 can operate in three modes— batch, direct-to-source and streaming. All three ingestion types can run concurrently.

Datasets from batch sources are file based. For example Mainframe batch datasets would arrive as COBOL™ files, or Database batch datasets may arrive in common separated values (CSV) file format.

Datasets ingested using the direct-to-source mechanism are directly ingested from the source system, bypassing the intermediary step of first extracting the dataset to a file and then ingesting the file. Streaming ingestion supports ingesting datasets that are continuously streaming for extended periods of time.

The ingestion engine 104 interacts with various components of the management system 100: a scheduler 106, a metadata repository 108, a security policy administrator 110, a data access layer 112, and a storage repository 114.

The scheduler 106 initiates the job. The ingestion engine 104 stores the target metadata model for each feed, as well as data lineage, and business taxonomies in the metadata repository 108. The ingestion engine 104 also stores information about schema versioning and metadata versioning in the metadata repository 108.

When a request for ingestion arrives, the ingestion engine 104 loads metadata from the metadata repository 108 for that dataset 102. The ingestion engine 104 then transforms the dataset 102 into a transformed dataset 122 having specified output formats and stores it in the storage system 114 as specified in the metadata (e.g., Avro™, Parquet™ Optimized Row Columnar (ORC), Druid™, Cassandra™, MongoDB™, etc. . . . ).

The ingestion engine 104 also determines which security policies apply for the dataset 102 within the security policy administrator 110, based on the security classifications defined within the metadata. Security is handled through metadata by specifying the classification of the datasets, both for the dataset 102 as a whole and for each field. The data classification drives how the data is protected once it enters the data lake. The ingestion engine 104 will automatically apply the associated security tags that tie into the proper security policies and access control to the data.

The system 100 may be designed such that it is platform independent with respect to the implementation of the components it interacts with. For example, for the security policy repository it can work with Apache Ranger™ or Apache Sentry™, and if a new repository is released in the future, an adapter specific to that repository may be added. The system 100 itself does not need to change. Which adapter will be loaded at runtime is driven by metadata and can be modified dynamically once the new adapter is deployed in the target environment.

In addition to standardizing the data, the ingestion engine 104 applies the security policy to the standardized data as well as the original data file based on security classifications specified in the metadata both at the dataset level and at the field level.

Figure 2A:
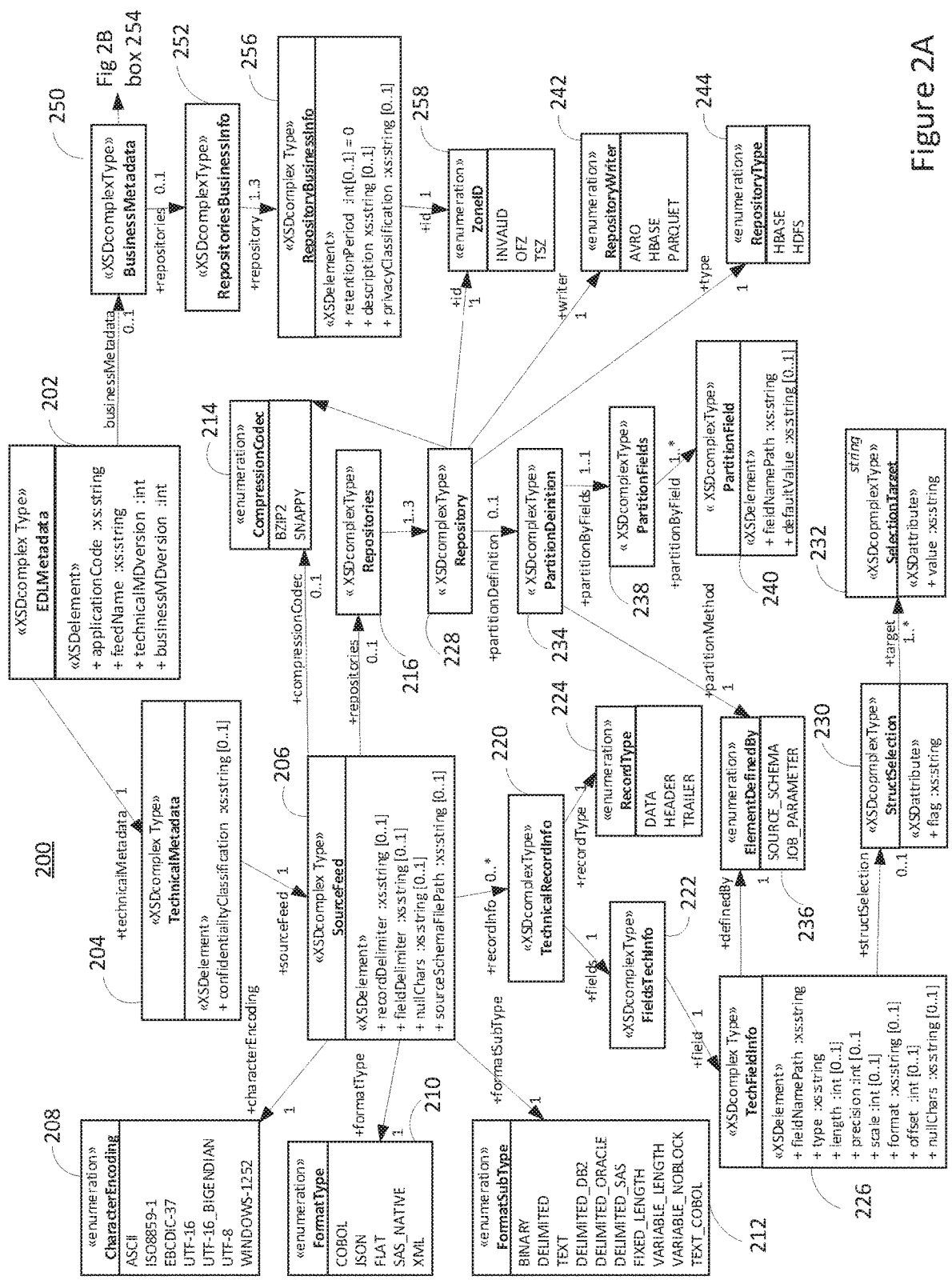
FIG. 2A is the metadata model that source metadata follows in order to instruct the ingestion engine as to how to handle the incoming data.
Figure 2B:
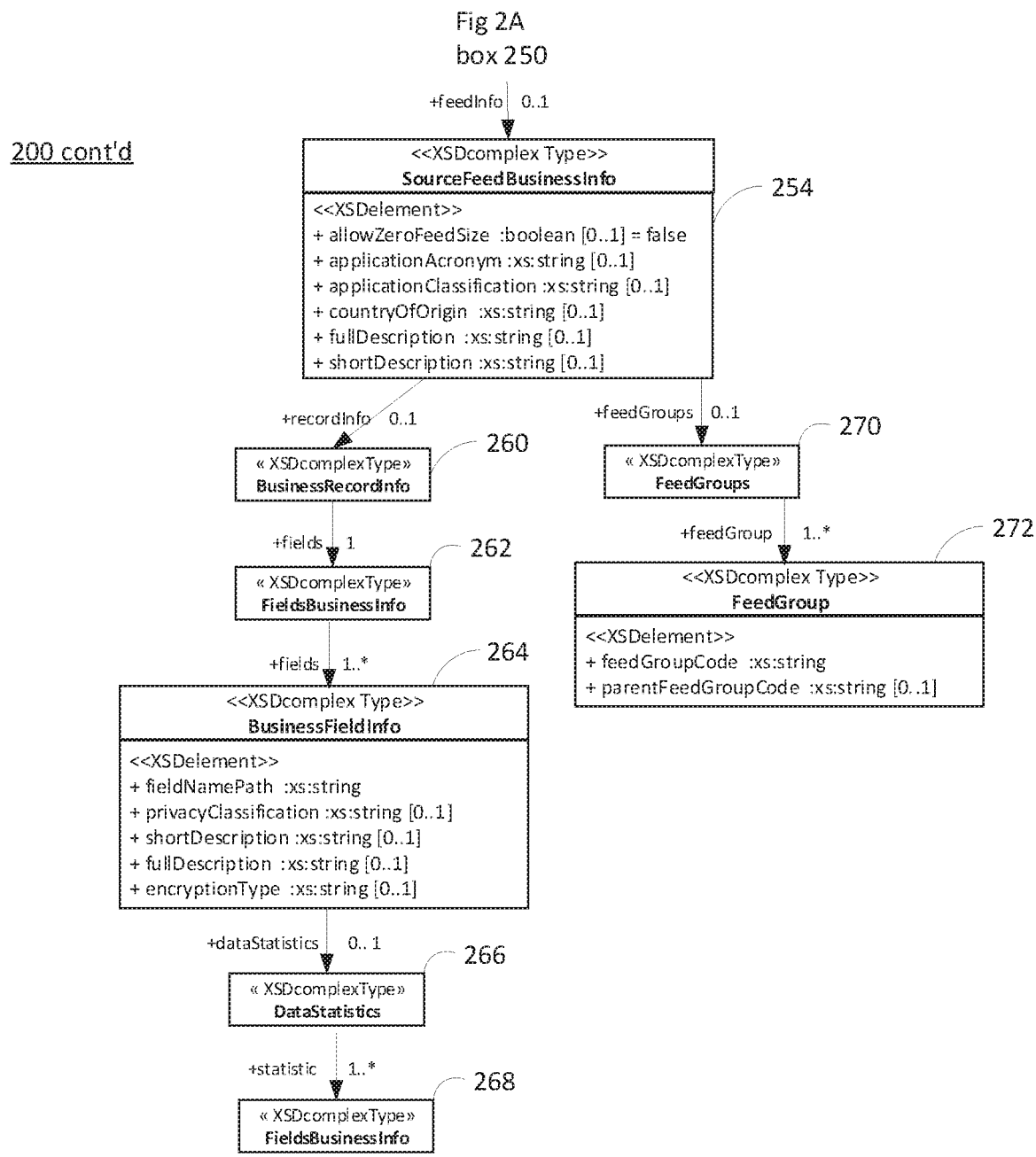
FIG. 2B is a continuation of the metadata model of FIG. 2A.

FIG. 2A and FIG. 2B are an exemplary metadata model that may be used by a system 100 shown in FIG. 1. This source metadata follows such a metadata model in order to instruct the ingestion engine 104 as to how to handle the incoming data. The metadata model may include but is not limited to the following components: EDLMetadata 202, TechnicalMetadata 204, SourceFeed 206, CharacterEncoding 208, FormatType 210, FormatSubtype 212, CopmressionCodec 214, Repositories 216, TechnicalRecord Info 220, FieldsTechInfo 222, RecordType 224, TechFieldInfo 226, Repository 228, StructSelection 230, SelectionTarget 232, PartitionDefinition 234, ElementDefinedBy 236, PartitionFields 238, PartitionField 240, RepositoryWriter 242, RepositoryType 244, BusinessMetadata 250, RepositoriesBusinessInfo 252, SourceFeedBusinessInfo 254, RepositoryBusinessInfo 256, ZoneID 258, BusinessRecordInfo 260, FieldsBusinessInfo 262, BusinessFieldInfo 264, DataStatistics 266, StatisticType 268, FeedGroups 270, and FeedGroup 272.

Table 1 below lists instructions shown in FIGS. 2A and 2B utilized by an embodiment of the ingestion engine 104 including a description of the supported instructions for that embodiment. Instructions have multiple attributes that:

TABLE 1 ingestion engine 104 Instruction Set

| Instruction | Description |
| --- | --- |
| EDLMetadata 202 | Instructs the ingestion engine 104 that the following instructions are for the ingestion of a uniquely defined source data and what version of the technical and business metadata these instructions are for |
| TechnicalMetadata 204 | Instructs the ingestion engine 104 that the set of instructions under this branch are for the technical transformation of the dataset |
| CharacterEncoding 208 | Instructs the engine 104 as to what character encoding to use to read the bytes in the given file |

TABLE 1-continued ingestion engine 104 Instruction Set

| Instruction | Description |
| --- | --- |
| FormatType 210 | Instructs the engine 104 as to what format the content of the file is in |
| FormatSubType 212 | Further instructs the engine 104 as to specific subtype within the FormatType 210 that the content of the file is in |
| CompressionCode 214 | Instructs the ingestion engine 104 as to what compression algorithm to use to decompress or compress the dataset received |
| Repositories 216 | Instructs the ingestion engine 104 that this source is part of a grouping of repositories |
| FieldsTechInfo 222 | Instructs the ingestion engine 104 that the enclosed elements define the technical metadata of the individual fields in the dataset |
| StructSelection 230 | Instructs the ingestion engine 104 about special instructions for certain FormatTypes |
| SelectionTarget 232 | Instructs the ingestion engine 104 that there is a second level of special instructions for processing the dataset |
| ElementDefinedBy 236 | Instructs the ingestion engine 104 where to get the value from for certain elements |
| PartitionFields 238 | Instructs the ingestion engine 104 that the enclosed elements define the fields that specify what fields the dataset will be partitioned by |
| PartitionField 240 | Instructs the ingestion engine 104 that this element defines one of the fields to partition the dataset by |
| RepositoryWriter 242 | Instructs the ingestion engine 104 what format to write the target dataset in |
| RepositoryType 244 | Instructs the ingestion engine 104 which repository to write the transformed dataset to |
| BusinessMetadata 250 | Instructs the ingestion engine 104 that the enclosed elements define the business metadata aspects of this datasource |
| RepositoryBusiness Info 256 | Instructs the ingestion engine 104 as to the lifecycle and classification of the dataset |
| ZoneID 258 | Instructs the ingestion engine 104 as the which repository the dataset belongs to |
| StatisticType 268 | Informational field used to provide information to the user |
| FeedGroups 270 | Instructs the ingestion engine 104 that the feed is part of the enclosed feed groups |
| FeedGroup 272 | Instructs the ingestion engine 104 to group its sources under the same umbrella. |
| SourceFeed 206 | Instructs the ingestion engine 104 on how to deal with this source feed by specifying the source type, the encoding and the format. Depending on the type it will also instruct on how to parse each record |
| RecordType 224 | Instructs the ingestion engine 104 on how to deal with each record by specifying the type of each record and how to deal with each type. |
| TechFieldInfo 226 | Instructs the ingestion engine 104 on how to deal with each field in each record |
| Repository 228 | Instructs the ingestion engine 104 on how to technically standardize the ingested data source and where to store it. |
| PartitionDefinition 234 | Instructs the ingestion engine 104 on how to partition data from this source. Instructions can define either a static key for partitioning, or dynamic keys based on values in different fields in the ingested dataset. |
| SourceFeedBusiness Info 254 | Instructs the ingestion engine 104 on how to deal with the dataset from a business perspective. For example, how to classify the data, what the data represents, location of the data from a business perspective (e.g., country) |
| BusinessRecordInfo 260 | Instructs the ingestion engine 104 on how to handle each record from a business perspective (e.g., privacy classification at a row level) |
| RepositoriesBusiness Info 252 | Instructs the ingestion engine 104 on how to handle the lifecycle of the dataset |
| BusinessFieldInfo 264 | Instructs the ingestion engine 104 on how to handle each field from a business perspective (e.g., how to secure the field, what the field means semantically) |

TABLE 1-continued ingestion engine 104 Instruction Set

| Instruction | Description |
|---|---|
| DataStatistics 266 | Instructs the ingestion engine 104 to enrich the provided metadata with profiling and statistical metadata |

On the consumer side, a consumption engine (not shown) may operate on the metadata that describes various flows and transformations of data based on business requirements. This enables the data consumers to identify sources they want to pull data from, what algorithms they want to apply, input and output parameters, what the target repository is, and what visualization tool the output should feed into. Consumers can define all this visually through a graphical user interface (GUI), and do not need to write any code. Instead, the GUI will generate metadata to capture this information. This metadata can then be fed to the ingestion engine 104 in different environments, and eventually be promoted to production. The ingestion engine 104 will then take care of all the background work and plumbing required to properly route the data through the required components. This approach gives consumers the ability to customize their data flow, without the need to generate code. This means that they do not need to spend the time to go through a SDLC, and can get their results out to market faster. They also do not need to spend any effort on the backend plumbing required to standardize and properly route the data as required. Instead, they can focus on their end goal, which is writing the analytics or reporting algorithms.

The above-described embodiments are intended to be examples of the present invention and alterations and modifications may be effected thereto, by those of skill in the art, without departing from the scope of the invention, which is defined solely by the claims appended hereto.

It should be understood that the phrase "a" or "an" used in conjunction with the Applicant's teachings with reference to various elements encompasses "one or more" or "at least one" unless the context clearly indicates otherwise. Additionally, conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

While the Applicant's teachings have been particularly shown and described with reference to specific illustrative embodiments, it should be understood that various changes in form and detail may be made without departing from the scope of the teachings. Therefore, all embodiments that come within the scope of the teachings, and equivalents thereto, are claimed. The descriptions and diagrams of the methods of the Applicant's teachings should not be read as limited to the described order of elements unless stated to that effect.

While the Applicant's teachings have been described in conjunction with various embodiments and examples, it is not intended that the Applicant's teachings be limited to such embodiments or examples. On the contrary, the Applicant's teachings encompass various alternatives, modifications, and equivalents, as will be appreciated by those of skill in the art, and all such modifications or variations are believed to be within the scope of the invention.

What is claimed is:

1. A system for automatically ingesting data into a data lake, the system comprising:
    computer readable memory having recorded thereon instructions for execution by a processor having an ingestion engine and a metadata model, said instructions configured to:
        determine, automatically via the metadata model, a type of metadata the ingested data contains, the ingested data being associated with source metadata following the metadata model, the source metadata comprising a source type of the metadata;
        generate guidelines for processing and transforming the ingested data based on the determined metadata;
        apply the guidelines at the ingestion engine for how the ingestion engine processes and transforms the ingested data based on the determined metadata; and
        store the transformed ingested data to a storage repository based on the determined metadata.

2. The system of claim 1, wherein the generated guidelines include specifying the source type and encoding for the metadata.

3. The system of claim 1, wherein the generated guidelines include specifying each type of record within the ingested data and how to manage each type of record.

4. The system of claim 1, wherein transforming the ingested data includes standardizing the ingested data.

5. The system of claim 1, comprising a further instruction of applying security policies to the ingested data based on the determined metadata.

6. The system of claim 1, wherein the determined metadata may be technical metadata or business metadata.

7. The system of claim 1, wherein the source for the ingested data is selected from the group consisting of a COBOL file, common separated values format, and ORACLE files.

8. A computer-implemented method for automatically ingesting data into a data lake having steps of:
    automatically determining a type of metadata the ingested data contains based on a metadata model, the ingested data being associated with source metadata following the metadata model, the source metadata comprising a source type of the metadata;
    generating guidelines for processing and transforming the ingested data based on the determined metadata;
    processing and transforming the ingested data based on the generated guidelines; and
    storing the transformed ingested data to a storage repository based on the determined metadata.

9. The method of claim 8, wherein the generated guidelines include specifying the source type and encoding for the metadata.

10. The method of claim 8, wherein the generated guidelines include specifying each type of record within the ingested data and how to manage each type of record.

11. The method of claim 8, wherein transforming the ingested data includes standardizing the ingested data.

12. The method of claim 8, further comprising applying security policies to the ingested data based on the determined metadata.

13. The method of claim 8, wherein the determined metadata may be technical metadata or business metadata.

14. The method of claim 8, wherein the source for the ingested data is selected from the group consisting of a COBOL file, common separated values format, and ORACLE files.

\* \* \* \* \*